C. W. HOTTMANN.
MEAT CUTTER.
APPLICATION FILED AUG. 1, 1911.
1,017,213.
Patented Feb. 13, 1912.
2 SHEETS—SHEET 1.
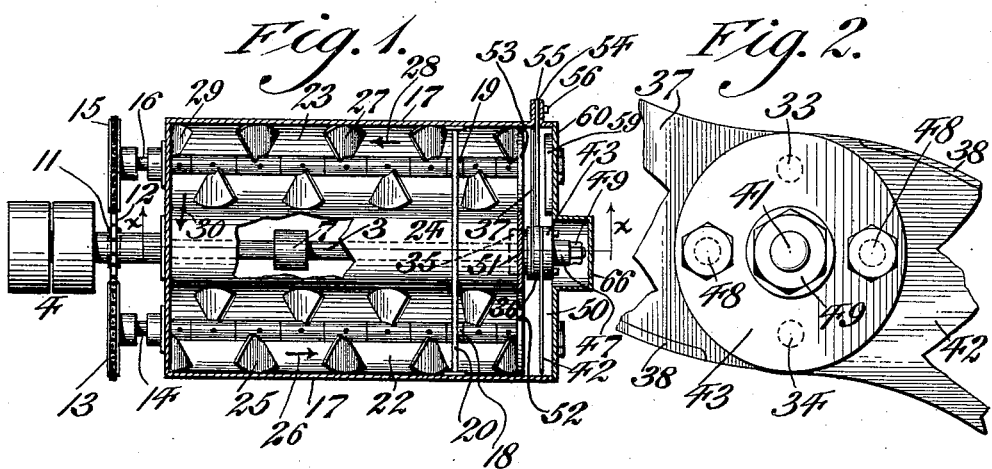
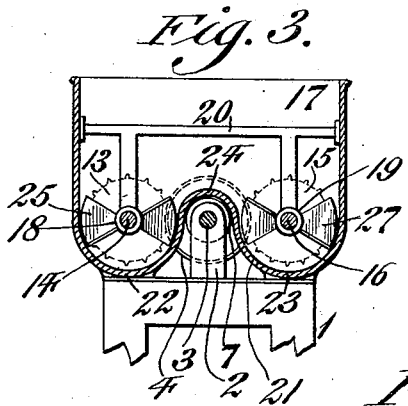
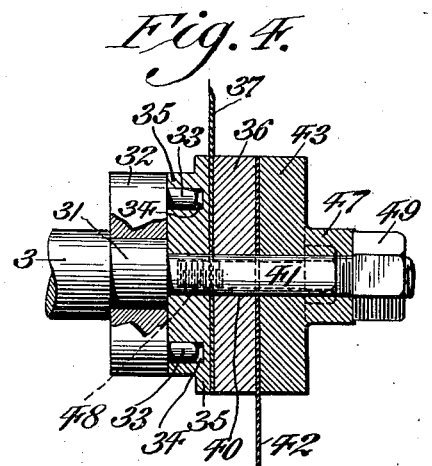
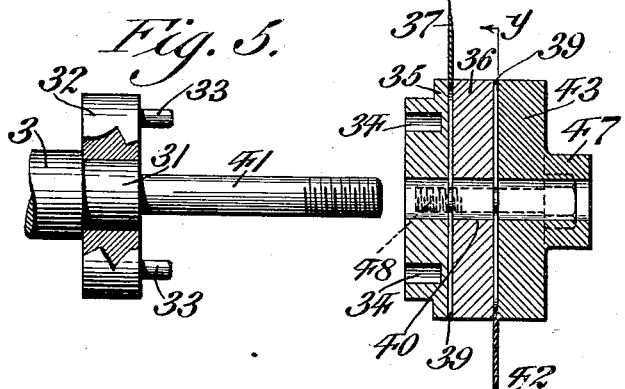
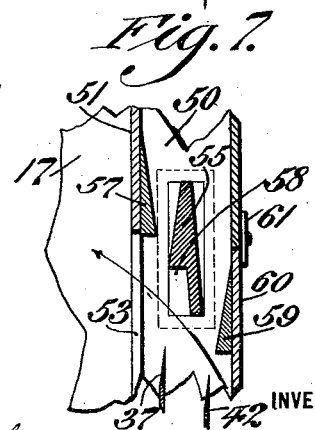

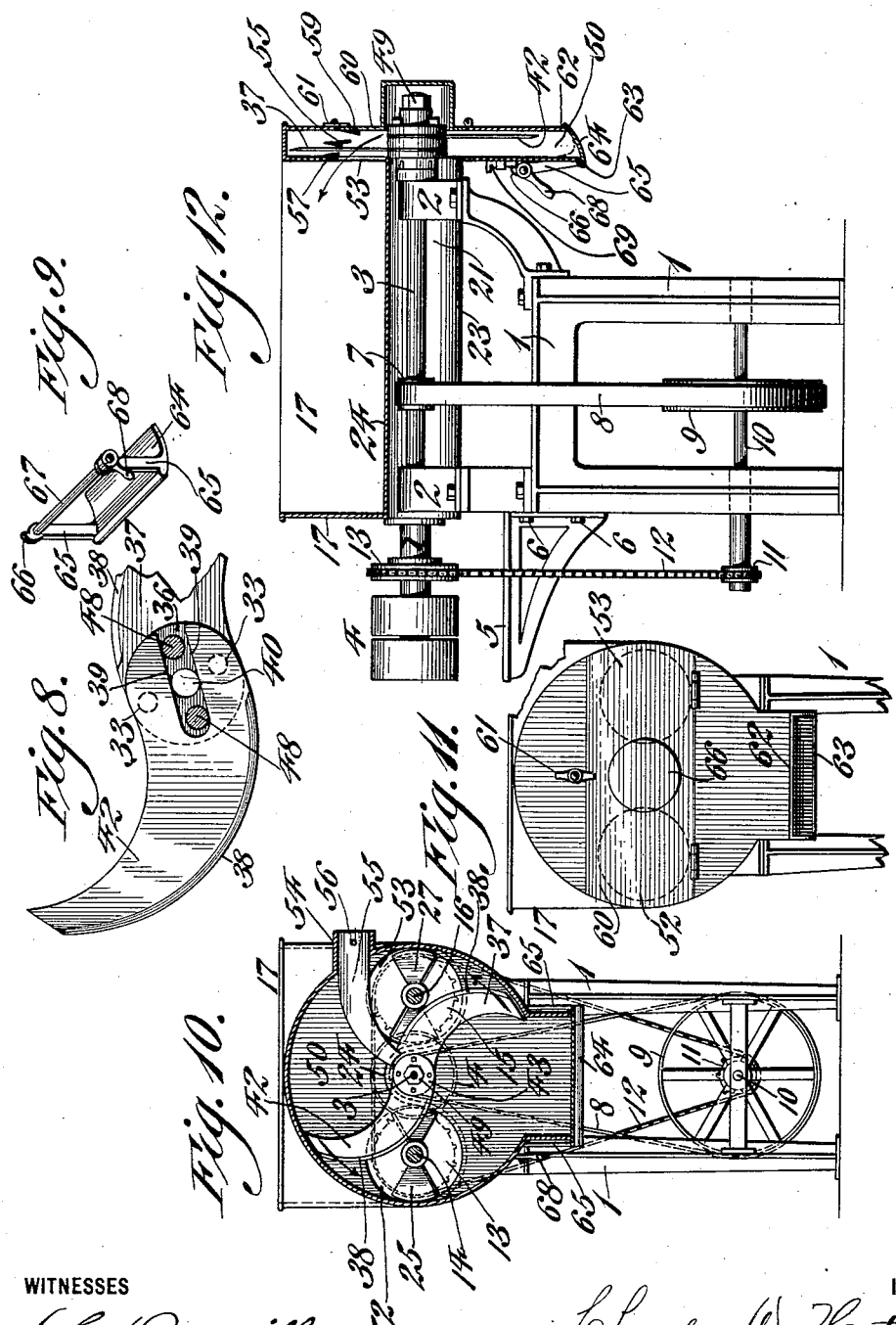

UNITED STATES PATENT OFFICE.

CHARLES W. HOTTMANN, OF PHILADELPHIA, PENNSYLVANIA, ASSIGNOR TO RICHARD T. RANDALL, OF PHILADELPHIA, PENNSYLVANIA.

MEAT-CUTTER.

1,017,213.  Specification of Letters Patent.  Patented Feb. 13, 1912.

Application filed August 1, 1911. Serial No. 641,709.

*To all whom it may concern:*

Be it known that I, CHARLES W. HOTTMANN, a subject of the Emperor of Germany, having resided in the United States one year last past and having declared my intention of becoming a citizen thereof, residing in the city and county of Philadelphia, State of Pennsylvania, have invented a new and useful Meat-Cutter, of which the following is a specification.

One of the main objects of my present invention is to devise a novel meat cutting machine, wherein the parts are constructed and arranged in a novel manner and wherein the machine may be readily cleansed and maintained in a sanitary condition.

Another object of my invention is to devise a novel cutting machine wherein a novel motion is imparted to the meat which is being cut, and wherein novel means are provided for cutting the meat and causing the same to be continuously fed to the cutting mechanism.

With the above and other objects in view, which will more clearly hereinafter appear in the detailed description, my invention consists of a novel meat cutting machine wherein a continuous travel is imparted to the meat being cut so that the same will be properly mixed during its passage to a novel cutting mechanism and then will be accurately fed from the cutting mechanism, novel means being provided for controlling the discharge of the meat from the machine.

It further consists of other novel features of construction all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a meat cutting machine embodying my invention. Fig. 2 represents a side elevation of a portion of the cutting mechanism. Fig. 3 represents a sectional elevation of Fig. 1. Fig. 4 represents a sectional elevation of a portion of the machine, showing more clearly the novel manner in which the knives are maintained in assembled position. Fig. 5 represents a side elevation of a portion of Fig. 4. Fig. 6 represents a sectional elevation of the knives and their adjuncts. Fig. 7 represents a sectional plan view of a portion of the machine showing more clearly the manner in which the knives actuate. Fig. 8 represents a section on line $y$—$y$, Fig. 6. Fig. 9 represents a perspective view of a portion of Fig. 1. Fig. 10 represents a sectional elevation of Fig. 1. Fig. 11 represents an end elevation of the machine. Fig. 12 represents a section on line $x$—$x$ Fig. 1.

Similar numerals of reference indicate corresponding parts in the figures.

Referring to the drawings:—1 designates the frame of the machine which is provided with suitable journals 2 in which is mounted a main driving shaft 3, said shaft being provided with pulleys 4 whereby the shaft 3 may be driven in any desired manner, and, in the present instance, I have shown the standard 1 as provided with a bracket or table 5 adjustably secured to the frame 1 by means of fastening devices 6 and adapted to support any desired type of a motor.

7 designates a pulley on the shaft 3 with which is adapted to engage a belt 8 which passes around a pulley 9 on the shaft 10, mounted in the frame 1, said shaft 10 being provided with a sprocket wheel 11, around which passes a sprocket chain 12, said sprocket chain also passing around a sprocket wheel 13 on a feed shaft 14 and also around a sprocket wheel 15 carried by a feed shaft 16. The shafts 14 and 16 are journaled exterior the casing 17, which is adapted to receive the meat which is to be cut, said shafts passing through the casing and being also journaled, in the present instance, in sleeves 18 and 19, carried by a bar 20 which is secured to the casing 17. The casing or container 17 is formed in a novel manner, the same comprising a bottom member 21, the bottom of which is rounded as is indicated at 22 and 23, while the central portion thereof is upwardly deflected and rounded as indicated at 24. As will be best understood by reference to Figs. 3 and 12, in order that the driven shaft 3 will not come into contact with the meat which is in the container 17, the shaft 14 is mounted fed to the cutting mechanism until the same is reduced to the proper fineness.

In order that the meat may be automatically fed from the machine, I provide the valve member 64, it being understood that when the latch 69 is raised, the lever 68 may be actuated so as to move the valve 64 into its open position, whereupon the meat passing into chamber 50 will pass therefrom to a desired receptacle, or place of utilization.

In devices of this character, as heretofore constructed, it has been very difficult to maintain the machine in the proper sanitary condition, and special attention is directed to such features of my invention. When it is desired to remove the cutting mechanism, this may be readily and quickly accomplished since it is only necessary to remove the fastening devices 56, whereupon the stationary blade 55 may be removed for inspection, grinding or cleansing. When it is desired to remove the rotating parts of the cutting mechanism, it is simply necessary to actuate the latch 61 whereupon the hinged plate 60 may be dropped and by simply removing the nut 49 the cutting mechanism may be readily removed. When it is desired to remove or adjust the rotatable knives 37 or 42, it is simply necessary to actuate the cap screws 48 whereupon the parts may be readily taken apart for inspection or other purposes. Special attention is also directed to the novel construction of the bottom of the container, it being noted that the central portion of the bottom thereof is upwardly deflected in order that the shaft 3 will not come into contact in any manner whatever with the meat which is being cut.

It will be seen that as the cutting blade 37 rotates between the wedge shaped blocks 59 and the stationary blade 55 and as the cutting blade 42 travels between the stationary blade 55 and the wedge block 59, owing to the high speed at which the blades 37 and 42 are revolving, the meat will be cut in a very accurate and reliable manner.

Particular attention is drawn to the fact that in my novel device, the cutting mechanism may be readily removed in its entirety in order to cleanse the same, and the feed blades 25 and 27 as well as the shafts 14 and 16 may be readily removed if desired, and there are no overhanging or underhanging ledges or projections upon which the meat is liable to be retained, so that I am enabled at all times to maintain the machine in a very sanitary condition.

Owing to the novel construction of cutting mechanism, and the manner of feeding the meat thereto and therefrom, I have found in practice that a much larger amount of meat may be operated upon in a given time, than is possible in any of the machines heretofore employed for this purpose.

It is of course to be understood that any desired number of rotatable or stationary knives or cutting blades may be employed, and the number of the same will vary in accordance with the character of work which is to be done.

It will now be apparent that I have devised a novel and useful construction of a meat cutter which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a stationary container having a chamber at one end and provided with a plurality of feed channels located side by side and opening into said chamber, cutting mechanism within said chamber, means within said channels for feeding the meat to and from such chamber and from one feed channel to the other, and actuating means for the feeding mechanism and the cutting mechanism.

2. In a device of the character stated, a stationary container having a chamber at one end and provided with a plurality of feed channels opening into said chamber, cutting mechanism within said chamber, means within said container on opposite sides thereof for feeding the meat to and from such chamber and from one feed channel to the other, actuating means for the feeding mechanism and the cutting mechanism, and means for controlling the discharge of meat from said chamber.

3. In a device of the character stated, a stationary container, cutting mechanism therein, a plurality of feeding mechanisms within the container, one of said feed mechanisms being adapted to feed the meat to the cutting mechanism, and the second feed mechanism being adapted to feed the meat from said cutting mechanism to said first feeding mechanism, means for rotating one of the feeding mechanisms in a direction opposite to that of the other feeding mechanism, and actuating means for the cutting mechanism.

4. In a device of the character stated, a stationary container, having the central portion thereof upwardly deflected thereby forming feed channels, a feed screw located in each of said feed channels and said feed screws being adapted to feed the meat in clutch collar, a plurality of blades having slots therein through which said shaft is adapted to extend, a washer between said blades, a second washer exterior of one of said blades and a nut having threaded engagement with said shaft for securing said blades in their adjusted position.

15. In a device of the character stated, a container, a driving shaft having one end located within one end of said container, a clutch collar fixed on said shaft and provided with clutch pins, a second collar having means adapted to coact with said clutch pins, a blade having a slot therethrough and adapted to engage the second clutch collar, a washer engaging said blade, a second blade having a slot therethrough engaging said washer, a second washer exterior of said second blade, means for securing said second clutch collar, said washers and said blade in assembled position, whereby they form a unit of structure, said second clutch collar and washers having an aperture therethrough through which said shaft is adapted to extend, and means for removably securing said unit with respect to said shaft.

16. In a device of the character stated, a stationary container having a plurality of feed channels and provided at one end with a chamber extending downwardly beyond said feed channels, a partition in said container at one end having ports communicating with said chamber, a conveyer located in each one of said channels and in alinement with a port in said partition, one of said conveyers at the end opposite said port having means for causing the feed of material from one channel to the other, cutting mechanism within said chamber including a plurality of blades adapted to revolve in proximity to such ports, a stationary cutting blade adjustably carried by said casing and extending into said chamber, and means for rotating said conveyers in opposite direction and for revolving the plurality of cutting blades.

17. In a device of the character stated, a frame, a stationary container carried thereby and having the central portion thereof upwardly deflected to form a plurality of feed channels and provided at one end with a chamber extending beneath the bottom of said feed channels, a partition in said casing having a port in alinement with each feed channel and communicating with said chamber, a food conveyer located in each feed channel, one of said conveyers being adapted to feed the material to said port and the other of said conveyers being adapted to feed the material from the other of said ports, a shaft exterior of the casing and having one end extending into said chamber, cutting mechanism removably carried on the end of said shaft, a removable closure for said casing in alinement with said cutting mechanism whereby the latter may be bodily removed, and means for rotating said conveyers in opposite directions and for actuating said driving shaft.

CHARLES W. HOTTMANN.

Witnesses:
WM. CANER WIEDERSEIM,
F. A. NEWTON.

---

Copies of this patent may be obtained for five cents each, by addressing the "Commissioner of Patents, Washington, D. C."